(12) United States Patent
Tompson et al.

(10) Patent No.: US 8,630,194 B2
(45) Date of Patent: Jan. 14, 2014

(54) SYSTEM AND PROCESS FOR DIMENSIONING A CELLULAR TELECOMMUNICATIONS NETWORK

(75) Inventors: Nicholas Andrew Tompson, South Hobart (AU); Bruce Stephen Northcote, Prospect (AU)

(73) Assignee: Telstra Corporation Limited, Melbourne (AU)

( * ) Notice: Subject to any disclaimer, the term of this patent is extended or adjusted under 35 U.S.C. 154(b) by 616 days.

(21) Appl. No.: 12/743,669

(22) PCT Filed: Nov. 20, 2008

(86) PCT No.: PCT/AU2008/001721
§ 371 (c)(1), (2), (4) Date: Sep. 29, 2010

(87) PCT Pub. No.: WO2009/065173
PCT Pub. Date: May 28, 2009

(65) Prior Publication Data
US 2011/0007645 A1      Jan. 13, 2011

Related U.S. Application Data

(60) Provisional application No. 60/989,351, filed on Nov. 20, 2007.

(51) Int. Cl.
*G01R 31/08* (2006.01)
*G06F 11/00* (2006.01)

(52) U.S. Cl.
USPC ............................................. 370/252

(58) Field of Classification Search
USPC ............................................. 370/252
See application file for complete search history.

(56) References Cited

U.S. PATENT DOCUMENTS

2004/0032828 A1    2/2004  Satt et al.
2004/0068556 A1 *  4/2004  Radpour ................. 709/223

FOREIGN PATENT DOCUMENTS

WO    WO 03/024133 A1    3/2003
WO    WO 2004/025980 A1  3/2004

* cited by examiner

*Primary Examiner* — Mark Rinehart
*Assistant Examiner* — Maharishi Khirodhar
(74) *Attorney, Agent, or Firm* — Wolf, Greenfield & Sacks, P.C.

(57) ABSTRACT

A process for dimensioning a cellular telecommunications network, including, for each of one or more network elements of the network: accessing network element environment data representing a configuration and environment of the network element; accessing QoS data representing quality of service criteria for users of the network; and processing the network element environment data and the QoS data to generate network element capacity data representing combinations of loads of network services corresponding to capacities of the network element that meet the quality of service criteria.

18 Claims, 13 Drawing Sheets

SYSTEM AND PROCESS FOR DIMENSIONING A CELLULAR TELECOMMUNICATIONS NETWORK

TECHNICAL FIELD

The present invention relates to a system and process for dimensioning a cellular telecommunications network, in particular for dimensioning a UMTS or WCDMA network.

BACKGROUND

Analysis of cellular telephone networks, e.g. those using the Global System for Mobile communications (GSM) standard, is used to predict the load on a network and how much load it can carry without causing difficulties. In particular, such analysis can be used to determine what network resources are required to provide an acceptable level of performance to users of the network, a process referred to as network dimensioning. For example, the analysis can determine blocking rates, which represent the likelihood that a request to establish an additional call is denied or 'blocked' to prevent established calls or other network services from suffering performance degradation.

Network dimensioning includes estimating resource quantities, such as the number of base transceiver stations, needed to support a certain network traffic load. Network dimensioning can be used to design a first generation deployment of a new network, referred to as a 'green-field' network, or to determine to what extent an existing network is or will be under- or over-loaded (for planning future capacity requirements).

The outcome of the network dimensioning process is used in radio network design processes to provide an early indication of network size and cost. The dimensioning phase is later followed by a planning phase during which more specific information is collected, enabling a more detailed analysis. Alternatively, the dimensioning process can be used to assess whether sufficient network capacity is installed for a current, or projected, usage load: in this case, dimensioning is used for planning in an existing network.

Network dimensioning is particularly important because it can be used to simultaneously ensure consistent customer experience, while also minimising capital and operational expenditure. Dimensioning can be carried out for both the short term (responding to traffic growth and local fluctuations) and the long term (planning and costing forward-looking traffic/product/service forecasts).

Currently, analysis of certain networks—those where network resources are shared in non-fixed amounts between users—provides insufficient information for accurate load analysis, network dimensioning, and network planning. An example of such a network is one using the Universal Mobile Telecommunications System (UMTS), a 'Third Generation' (3G) standard based on a Wideband Code Division Multiple Access (WCDMA) standard.

Dimensioning 3G networks is enormously more complex than dimensioning 2G networks, which is a relatively trivial task. As a WCDMA system, the 3G radio access network (RAN) has "soft" capacity limits. That is, each cell of the RAN serves different radio environments, traffic profiles and user behaviours, all leading to different and variable capacity limits. Accordingly, the amount of traffic that a cell can carry without adversely affecting customer experience can vary dramatically from cell to cell. Additionally, transport network (TN, the interconnections between base transceiver stations and radio network controllers) connection admission control and congestion management processes offer considerable control at the cost of greater complexity.

Currently, there are very few network dimensioning tools available commercially. Those that do exist appear to be added as an after-thought to network planning tools, and are based on simplistic assumptions that tend to be inappropriate for a WCDMA environment. For example, existing dimensioning tools are primarily oriented towards radio frequency (RF) and cell planning, with traffic and capacity modelling being implemented only to the extent required to support cell planning.

Dimensioning modules built into RF and cell planning tools tend to focus exclusively on management of uplink, and sometimes downlink and noise rise, instead of a broader analysis of radio resource management procedures.

Overly simplistic tools and processes for dimensioning can lead to excessive capital expenditure due to a necessarily conservative approach, or to a poor customer experience as a result of insufficient hardware provisioning.

It is desired to provide a system and process for dimensioning a cellular telecommunications network that alleviate one or more of the above difficulties, or at least that provide a useful alternative.

SUMMARY

In accordance with the present invention, there is provided a process for dimensioning a cellular telecommunications network, including, for each of one or more network elements of said network:
  accessing network element environment data representing a configuration and environment of the network element;
  accessing QoS data representing quality of service criteria for users of said network; and
  processing the network element environment data and said QoS data to generate network element capacity data representing combinations of loads of network services corresponding to capacities of said network element that meet said quality of service criteria.

Preferably, said network services include services that consume network resources shared between users of said network element.

Preferably, said network services include services that consume network resources that are shared in variable amounts between users of said network element.

Preferably, said processing includes performing a numerical simulation of the network element for each of a plurality of operating points of said network element, each operating point representing specified average loads of said network services, wherein loads of said network services are statistically distributed about the corresponding average value.

Preferably, the simulation is a Markov Chain simulation.

Preferably, said quality of service criteria include at least one criterion based on a performance metric other than blocking.

Preferably, said network element environment data also represents measured loads of each of a plurality of services of the network element, and the process includes processing said network element performance data to generate network element load data representing a load of said network element as a combination of said measured loads of said services, and comparing said network element load data with said network element capacity data to generate network element headroom data representing available capacity of said network element.

Preferably, the network element capacity data represents a boundary between combinations of loads of said services that meet said quality of service criteria and combinations of loads of said services wherein at least one of said quality of service criteria is not met.

Preferably, the process includes processing said network element capacity data to identify one or more of the most limiting of said resources.

Preferably, the process includes processing said network element capacity data to generate a ranked list of the most limiting of said resources.

Preferably, said step of processing said network element capacity data includes generating performance metrics representing a portion of time that user-perceived performance is unacceptable as a result of (i) blocking due to lack of dedicated resources or (ii) lack of shared access to non-dedicated resources; wherein the most limiting of said resources are identified on the basis of said performance metrics.

Preferably, said network elements include at least one cell of said network and at least one base transceiver station of said network, wherein the environment of a cell or a base transceiver station includes a radio environment of that cell or base transceiver station.

Preferably, said network is a WCDMA network.

The present invention also provides a computer readable storage medium having stored thereon program instructions for executing the steps of any one of the above processes.

The present invention also provides a system having components for executing the steps of any one of the above processes.

The present invention also provides a system for dimensioning a cellular telecommunications network, the system including:
 an environmental parameter generator configured to access network element environment data representing a configuration and radio environment of each of one or more network elements of said network; and
 a network element capacity generator configured to process the network element environment data and QoS data representing quality of service criteria for users of said network to generate network element capacity data representing combinations of loads of network services corresponding to capacities of each network element that meet said quality of service criteria.

Preferably, said network element capacity generator includes a Markov chain simulator configured to simulate each of a plurality of operating points of each network element, each operating point representing specified average loads of said network services, each of said network services being statistically distributed about the corresponding average value.

Preferably, said network element environment data also represents measured loads of each of a plurality of services of the network element, and the system includes a dimensioning data generator configured to process said network element performance data to generate network element load data representing a load of each network element as a combination of said measured loads of said services, and to compare said network element load data with said network element capacity data to generate network element headroom data representing available capacity of each of said network elements.

Preferably, said dimensioning data generator is configured to process said network element capacity data to identify one or more of the most limiting of said resources.

Preferably, said dimensioning data generator is configured to generate performance metrics representing a portion of time that user-perceived performance is unacceptable as a result of (i) blocking due to lack of dedicated resources or (ii) lack of shared access to non-dedicated resources; wherein the one or more of the most limiting of said resources are identified on the basis of said blocking data.

Preferably, said network is a UMTS network.

Preferably, said network is a WCDMA network.

The present invention also provides a computer-readable storage medium having stored thereon programming instructions for executing a process for dimensioning a cellular telecommunications network, the process including, for each of one or more network elements of said network:
 accessing network element environment data representing a configuration and environment of the network element;
 accessing QoS data representing quality of service criteria for users of said network; and
 processing the network element environment data and the QoS data to generate network element capacity data representing combinations of loads of said network services corresponding to capacities of said network element that meet said quality of service criteria.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
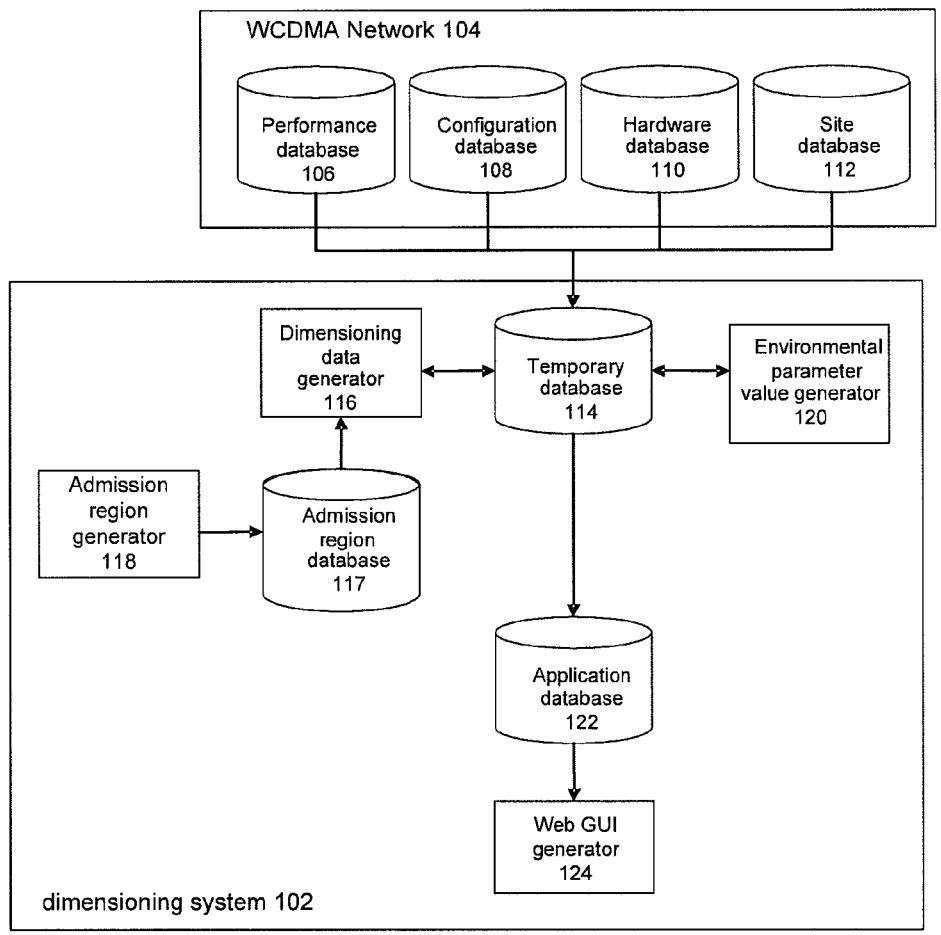
FIG. 1 is a block diagram of a preferred embodiment of a network dimensioning system connected to a WCDMA network.
Figure 12:
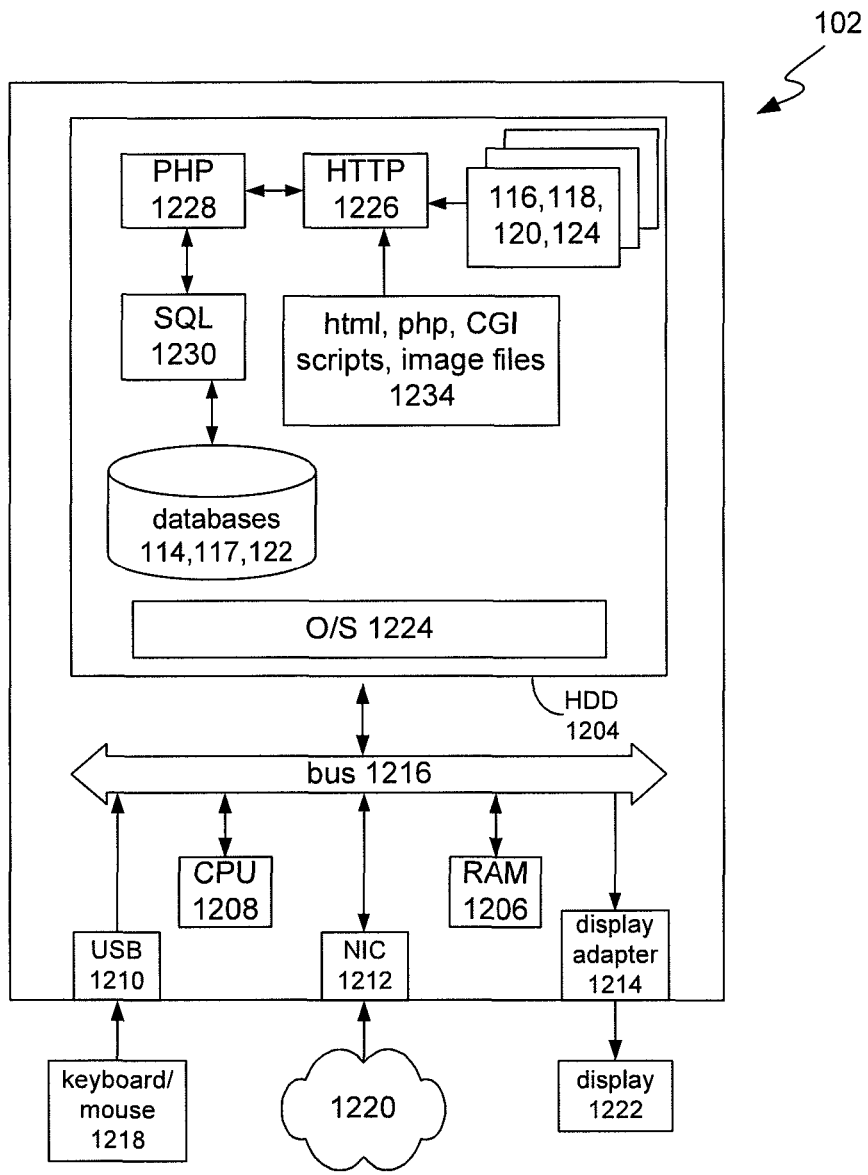
FIG. 12 is another block diagram of the dimensioning system of FIG. 1.
Figure 13:
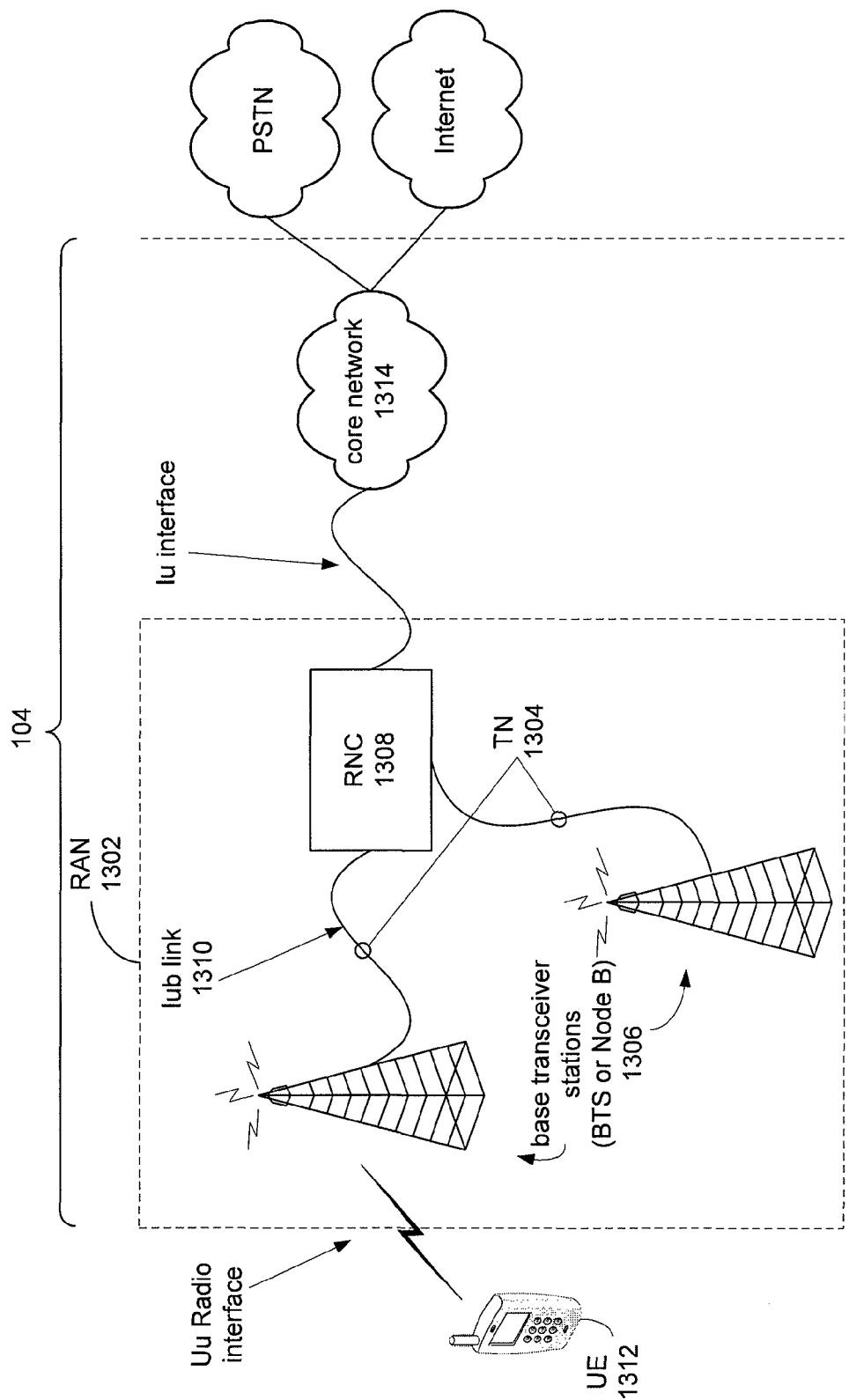
FIG. 13 is a schematic diagram of a UMTS network.

A dimensioning system 102, as shown in FIGS. 1 and 12, analyses UMTS networks, such as a Wideband Code Division Multiple Access (WCDMA) cellular radio telephone network 104, for network dimensioning purposes. As shown in FIG. 13, a WCDMA network includes a wireless portion, referred to as the Radio Access Network (RAN) 1302, and a wired portion, referred to as the Transport Network (TN) 1304. The RAN 1302 includes base transceiver stations (BTSs, also referred to in the art as "Nodes B") 1306 which are controlled by radio network controllers (RNCs) 1308 via an interface referred to in the art as Iub. Each BTS 1306 generates radio signals that define a network cell with which user equipment (UE, such as a standard cell phone) 1312 is associated in order to make and receive telephone calls via the corresponding BTS 1306.

Unlike simple 2G networks such as GSM, UMTS networks provide a plurality of network services to UEs 1312, including SRB (standalone signalling radio bearer), Speech, Video, R99 packet data, and HSDPA packet data. HSDPA (High Speed Downlink Packet Access) is a protocol in the UMTS standard for high-speed data transfer from the network 104 to a UE.

Each network service consumes resources of the network, including downlink (DL) channelisation codes, DL power, uplink (UL) Iub bandwidth, DL Iub bandwidth, and other resources specific to the manufacturer(s) of the network infrastructure. The resources consumed by a given network service can depend, at least in part, on the actual operating radio environment of each cell and its BTS 1306, as described further below.

Figure 2:
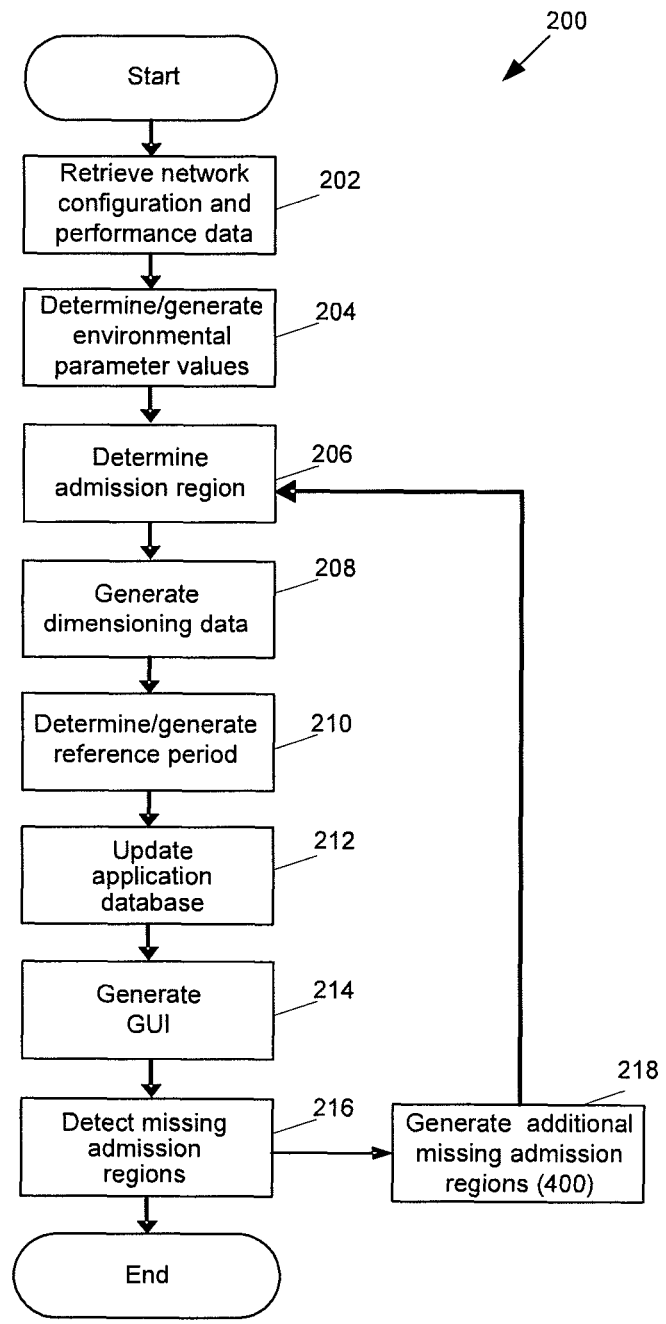
FIG. 2 is a flow diagram of a network dimensioning process executed by the system.

The dimensioning system 102 executes a dimensioning process 200, as shown in FIG. 2, that processes network usage and performance data representing actual measurements of network usage and performance to generate network dimensioning data for use in dimensioning a cellular telecommunications network. Given such a network that provides multiple user services and having multiple resources (at least some of which can be shared by network users) that are consumed by those services, such as the WCDMA network services and resources described above, the dimensioning system 102 and process 200 determine an engineered capacity for the network, expressed as a function of carried load and one or more specific 'target' Quality of Service (QoS) values for respective network services. The term 'engineered capacity' is a term of art that refers to the network load or loads at which one or more specified performance metrics are just satisfied.

As described in detail below, the dimensioning process 200 achieves this by processing actual configuration and measured traffic and performance data for each of one or more network elements of the network to determine the amount of each resource consumed by each service in each network element, taking into account the network element's actual measured environment. In the described embodiment, the network elements of interest are components of the RAN 1302, namely the radio cells and their associated BTSs 1306, because these are typically the most limiting network elements in existing UMTS networks. Accordingly, the environment of each BTS 1306 or cell includes its radio environment, in addition to its non-radio environment. In practice, one BTS 1306 typically includes antennas that generate three cells, each covering a corresponding 120° angle. Although each cell has its own antenna(s) and local radio environment (due to transmitted power, buildings, terrain, etc), in a UMTS network some resources of the BTS 1306 (e.g., WCDMA codes) are shared between cells, and hence the cells are not truly independent of one another. Accordingly, each cell and its BTS 1306 are treated independently as distinct network elements by the system 102.

Notwithstanding the emphasis on radio network elements in the described embodiment, it should be understood that the dimensioning system 102 and processes described herein can be applied to other (non-radio) network elements of the network, such as components of the UMTS core network 1314, and/or other intermediate network nodes, for example, in particular where those components are limiting the QoS provided to users of the network. However, in the following description, the term "network element" refers to a radio cell or a BTS 1302.

The capacity information generated by the dimensioning system 102 allows the dimensioning process 200 to determine combinations of carried load (in units of Erlangs) for each service for which all of the specified QoS targets will be met. In effect, these combinations define an N-dimensional capacity envelope such that, for any operating point (being a particular combination of simultaneous carried loads for N respective services), if that operating point lies within the envelope, it can be concluded that the network element is operating within its engineered capacity. A metric representing the smallest difference between the operating point and the capacity envelope, referred to herein as 'headroom' and expressed as a percentage of total system capacity, is indicative of the available or unused capacity of the network element at that time, taking into account the actual services being used, and the actual radio environment of the network element at that time.

The difference between the operating point and the capacity envelope allows the process 200 to identify the most limiting resources that prevent the network element from being able to provide additional services whilst maintaining the quality of service targets for already established services, so that plans for network expansion can be targeted towards expanding the available pool of those identified resources. Thus the network dimensioning system 102 and process 200 allow a network operator to assess the actual resource requirements of an existing network at a desired period, and/or to determine the resource requirements of the network 102 to provide for expanded services and/or traffic at a future time.

A user of a UE 1312 will perceive system performance to be unacceptable if either their call request is blocked or, for HSDPA users, once an HSDPA call is established, they do not get adequate access to the available pool of non-dedicated resources. For a given operating point that lies within the capacity envelope, it does not necessarily follow that any resource will be in a limiting state (e.g., if blocking is zero, and access to non-dedicated resources is always at an adequate level). However, as described below, the dimensioning process 200 can predict the resource(s) that are most likely to become the factor(s) limiting system capacity.

The dimensioning system 102 generates the dimensioning data indicative of the adequacy of the current installed capacity levels in the network 104 in light of the actual carried traffic, the current configuration and the radio environments of the network. The dimensioning system 102 generates the dimensioning data on the basis of data relating to both the radio access network (RAN) and the transport network (TN) of the network 104.

Consideration of HSDPA throughput as a performance metric is of greater interest to the operator of the UMTS network than only call blocking rates because many users, via their User Equipment (UEs), will be limited by HSDPA throughput.

Accordingly, the dimensioning data are used to provide quality-of-service data, e.g., call blocking rates and HSDPA throughput. The operator of the network 104 can use the quality-of-service data to ensure that specified performance targets (e.g., in a user service agreement) are maintained, or to plan for dimensioning of the network 104 (e.g., installation of more base transceiver stations). The dimensioning data advantageously allows the network operator to identify over-utilised resources at capacity-constrained network elements (e.g., there may be insufficient down-link power available). The operator can also identify which services are impacted by over-utilised resources at capacity-constrained network elements (e.g., video may be particularly degraded by the lack of power, whereas speech less so). Furthermore, the dimensioning data can be used to generate a report showing forward estimates of over-utilised resources and affected services for network elements not yet constrained by capacity (e.g., that although there are sufficient down-link channelisation codes, this will be the first resource to limit quality-of-service if load on the network element increases).

Through the use of data descriptive of the network 104 and its current operations, the dimensioning system 102 provides dimensioning in an operational context—i.e., relating to the installed operating network—rather than merely for new, green-field installations.

The adequacy of installed capacity is analysed for each network element in the network 104. Each network element is treated as a separate traffic aggregation point, and analysed independently. Having network element dimensioning data allows for network planning at a higher level of detail than dimensioning data related to higher level systems (e.g., network-wide performance based on generalised network and traffic behaviour).

For any given instance of a network element (e.g., a particular UMTS cell/carrier) over a given set of traffic data, a reference 'busy period' period is identified, during which the capacity situation can be summarised for that instance. The reference period is representative of the busy periods (i.e. high traffic load) of each network element, while avoiding extreme traffic peaks.

Thus the network dimensioning system 102 and process 200 allow a network operator to assess the actual resource requirements of an existing network at a desired time period, and determine the resource requirements of the network 102 to allow expanded services and/or traffic at a future time.

The network 104, as shown in FIG. 1, includes databases 106 to 112 that store both network configuration data and regularly-updated network performance data, as described below. The performance database 106 stores performance data generated by the RAN 1302 and TN 1304. The performance data includes information on the traffic carried per service, resource consumption and UE measurements observed at each network element in the network 104.

These databases 106 to 112 include performance and configuration databases 106, 108 that are implemented by the network equipment vendor, and thus the specific variables and quantities stored in the performance and configuration databases 106, 108 vary from vendor to vendor. However, irrespective of vendor, it will be apparent to those skilled in the art having access to these databases 106, 108 for a particular UMTS network, that the performance and configuration data stored therein can be accessed and processed as described below.

The performance data includes:
(i) traffic data representing traffic statistics at the network elements;
(ii) power data representing wireless power measurements at each network element;
(iii) measurement data, for HSDPA users of the cells, in the form of Channel Quality Information (CQI) data generated by the UE 1312 of each user;
(iv) soft-handover data relating to soft handovers; and
(v) softer-handover data relating to softer handovers.

The traffic data relates to a traffic load of the network 104 for a selected period—or snapshot—of time, e.g., during one hour, as configured by the network vendor or operator.

The traffic data for a given period can be considered to represent a traffic vector (i.e., an array of values) that constitutes the particular 'operating point' of the network 104 during the selected snapshot of time.

The soft handover data relates to statistical information describing the number of radio links currently contributing to macro diversity as per standard UMTS processes. Softer handover relates to statistical information describing the number of radio links originating from cells collocated at the same node B.

A configuration database 108 stores configuration data representing configuration of the RAN 1302 and TN 1304, including: (i) admission and congestion control parameters for each network element; (ii) configuration of Common Control Channels (CCH); (iii) configuration of the downlink (DL) power control parameters; and (iv) configuration of the TN 1304.

A hardware database 110 stores information on the hardware configuration of each BTS 1306, including: (i) the number and capabilities (i.e. maximum transmit power) of transmitter units; and (ii) the number and capacity (in terms of processing units) of baseband modulation units.

A site database 112 stores site-specific data, including a name and location for network element to allow end users of the system 102 to identify particular network elements.

The dimensioning system 102 automatically retrieves data from the databases 106 to 112 in the network 104 relating to traffic usage (e.g., the number of calls in each transmission time interval) and values of network parameters and performance (in particular the radio environment of each cell).

A temporary database 114 in the dimensioning system 102 provides intermediate storage for all incoming data from the four external databases 106 to 112. All data is flushed and updated on a weekly basis. The temporary database 114 is also used as a workspace as the weekly analysis tasks are carried out.

The dimensioning system 102 includes a dimensioning data generator 116 which generates dimensioning data for use in dimensioning UMTS networks. The dimensioning data includes network capacity data representing the maximum capacity of the network that still allows the network to meet specified quality of service (QoS) targets, traffic data representing one or more linear combinations of loads of different network services (each combination being considered to represent a traffic or operating state of the network at a particular time), and headroom data representing the remaining available capacity for measured carried traffic at each network element in the network.

The dimensioning data is generated on the basis of traffic data retrieved from the performance database 106, and network capacity data, representing capacity in the network 104. The network capacity data is generated by an admission region generator 118, using a model of the network 104. The network model is based on the configuration and environment of the network 104, as determined from the values of environmental parameters generated by an environmental parameter value generator 120 from the performance data retrieved from the performance database 106.

An Application Database 122 stores the dimensioning data for presentation using a Web-based Graphical User Interface (GUI) 124 that generates HTML data for sending to a standard web browser application executing on a remote computer system, thereby providing reports to a network operator or end user.

Network Analysis Process 200

The dimensioning system 102 generates the dimensioning data by executing a network dimensioning process 200, as shown in FIG. 2.

The network dimensioning process 200 commences with the dimensioning system 102 retrieving network configuration and performance data from the network databases 106 to 112 at step 202. To ensure currency of the dimensioning data, the dimensioning system 102 automatically refreshes its dataset on a frequent, periodic and regular basis (e.g., weekly). A complete refresh of all external data involves accessing the four databases 106 to 112 of the network 104 and retrieving the most up-to-date data. The dimensioning data, including data representing the available or unused network capacity (i.e., headroom) in the network 104 is generated for each traffic 'operating point' (which describes a traffic carried load for each service, expressed in units of Erlangs, over a traffic measurement period (e.g., an hour), and for each network element over a current reporting period (typically on a weekly basis). The generation of dimensioning data can be performed as often as desired, e.g. on a weekly basis, but is based on hourly resolution data (i.e., corresponding to the traffic measurement period).

Certain environmental parameters (as described below) that are used to determine the network capacity envelope are not directly available from the performance database 106. Values for these parameters, including parameters relating to quality-of-service targets (e.g., a target throughput 'R-target'), are generated by the parameter generator 120 in an environmental parameter value generation process 300 (at step 204).

A set of network capacity envelopes or 'admission regions' for corresponding combinations of network configuration and network element radio environments is pre-generated using common, or previously measured, values of the environmental parameters. From a database 117 of pre-generated admission regions, an appropriate admission region is selected at step 206, based on a corresponding combination of configuration and radio environment parameters (in a form of look-up table). Admission regions are generated by an admission region process 400, as described below, based on common/known values of network configuration and environmental parameters and are stored in the admission region database 117 for later use by the dimensioning data generator 116. Version control is used in the admission region database and the dimensioning data generator 116, such that admission regions generated by revised versions of the admission region generator 118 are flagged with a corresponding version identifier, thus ensuring currency while maximising admission region availability through periods of version transition. The dimensioning data generator 116 selects an appropriate admission region based on the current environmental parameter values at that time.

Generation of the dimensioning data (step 208) involves comparing the network capacity (represented by the determined admission region) to traffic load (represented by a traffic operating point as a linear combination of services) over the traffic measurement period (e.g. an hour).

Once the dimensioning data is generated, the dimensioning system 102 determines a reference period (step 210). The reference period represents one or more periods of time—represented in the dimensioning data—when traffic is consistently heavy, or busy, preferably without including extreme peaks in load. Performance statistics for this reference period are indicative of the capacity, load, and headroom of the network 104 during the most busy parts of the day/week/etc. For example, the most busy part of each day may be represented as a 'busy period'.

The dimensioning data is stored in the application database 122 in a transaction application database updating process (step 212). The application database update is performed as a single step for a full weekly set of dimensioning data, thus minimising disruption to the end user, or operator, of the GUI 124. The GUI 124 generates and displays reports of the dimensioning data in the application database 122 in accordance with operator/end user commands (step 214).

Since the admission region database 117 has at any time a finite number of admission regions, it is possible that the specific combination of configuration and environmental parameters for a particular network element might not have been previously encountered, i.e., admission regions for that combination have not previously been generated and stored in the admission region database 117. After a processing cycle is completed (steps 202 to 214), a list of missing admission regions is generated, and is used to generate admission regions for this new set of configuration and environmental parameter values (step 216).

The list of missing admission regions, including the corresponding configuration and environmental parameter data, is supplied to the admission region generator 118 for generation of additional admission region data (step 218). A given admission region corresponds to a specific set of configuration and environmental parameter values that are provided as inputs to the admission region generator 118. At any given time, multiple network elements can have identical configuration and environmental parameter values. Consequently, the task of generating missing admission regions can be prioritised by demand/importance/priority, ranked by number of network elements requiring each missing admission region, thereby ensuring that the more important regions (required by the greatest number of network elements) are generated first. As each admission region is generated, the additional admission region data is stored in the admission region database 117 for access by the dimensioning data generator 116 (at step 208). The network dimensioning process 200 therefore automatically updates information on the network capacity while still generating further dimensioning data. The feedback loop in step 218 allows the dimensioning system 102 to operate as a self-sufficient closed system. Generation of multiple admission regions (step 218) is performed in parallel.

Environmental Parameter Value Generation 300

Figure 3:
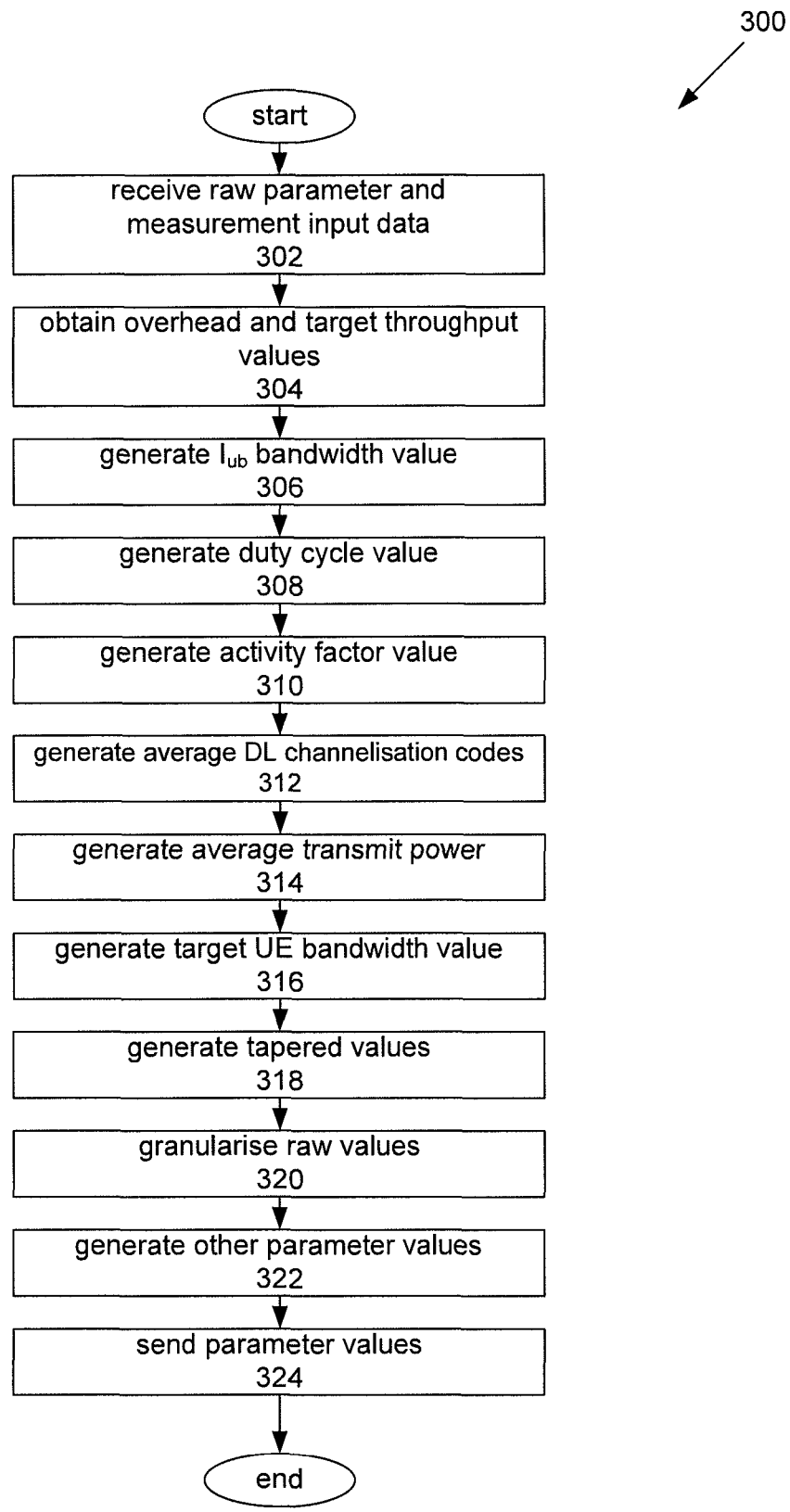
FIG. 3 is a flow diagram of an environmental parameter generation process of the network dimensioning process.

As described above, the environmental parameter value generator 120 generates values for environmental parameters from raw network performance and network configuration data using a parameter generation process 300, as shown in FIG. 3. Raw data from the network 104, representing the network 104 for the selected reporting time period, is combined with selections made by the operator to define how the network should perform (e.g. user-perceived HSDPA throughput targets) to generate the environmental parameter data.

The environmental parameters, described below, characterise the radio environment experienced by a network element as it affects resource consumption. The environmental parameters are generated in a way that ensures their independence from loading (traffic). Specifically, values for the environmental parameters are generated from a subset of the available network performance data, using variables or 'counters'—selected from the performance database 106—that are either intrinsically unaffected by traffic, or in cases where this is not possible, at least normalised by traffic. For example, total transmitted carrier power $P_{total}$ and common channel power $P_{CCH}$ are used to determine an environmental parameter value for the dedicated channel (DCH) power per-user, $P_{DCH-per-user}$, which is normalised by payload (in units of kbps), according to:

$$\text{DCH power-per-user} = (P_{total} + P_{CCH})/\text{Payload}.$$

The environmental parameters allow an admission region to be generated that meets a specified QoS target (e.g., a throughput target) that is not directly represented in measurable performance data, such as CQI.

In the environmental parameter generation process 300, the network performance and configuration data is received by the environmental parameter generator 120 from the temporary database 114 (step 302). The network performance and configuration data includes data indicative of the hardware, configuration and performance in the network 104 (from the databases 108 to 110), including the following, for the selected reporting time period (typically a week):
  (i) a radio environment of each network element;
  (ii) the services offered by the network;
  (iii) a total number of UEs transmitting, over all Transmit Time Intervals (TTIs) within the reporting period;
  (iv) the total number of UEs in the HSDPA scheduler over the same TTIs in the reporting period;
  (v) a CQI report over the reporting period;
  (vi) the MAC-hs retransmission rate ('r') of the network 104; and
  (vii) transmitted carrier power.

Additionally, the following system constants, having values selected by the operator or end user of the system, and stored in the temporary database 114 and the application database 122, are used in the environmental parameter generation process 300:
  (i) a value (referred to herein as 'o-Iub') representing processing overheads (expressed as a percentage) between the UMTS Iub link layer and the MAC-hs layer;
  (ii) a value (referred to herein as 'o-MAC-hs') representing processing overheads (expressed as a percentage) between the UMTS "MAC-hs" layer and the higher protocol layer at which $R_{target}$ is set, e.g., the IP layer;
  (iii) a value (referred to herein as 'n-TTI') representing the number of TTIs per transmission for any UEs designed to operate only on every nth TTI (this is a system constant, used by the HSDPA model); and
  (iv) a target through-put or QoS value (referred to herein as '$R_{target}$', expressed in kbps) representing a selected user-experience, desired by the network operator, throughput target measured at the higher protocol layer, e.g., the IP layer.

$R_{target}$ is a QoS measure, related to a customer's experience in using their UE across the network elements of the network 104. $R_{target}$ is specified for a selected protocol layer ('Layer-$R_{target}$') of the UMTS stack—e.g., for the IP layer—by the end user/operator.

At step 304, the values (system constants) for n-TTI, o-Iub, o-MAC-hs and $R_{target}$ are obtained, from the application database 122.

From the network's CQI report for an 'average' UE, transport format and resource combination (TFRC) data is estimated based on tables found in 3GPP standards (TS25.214, tables 7). The TFRC data provides specific information on the number of downlink channelisation codes required and the transmit power delta that shall be used on the HS-PDSCH for that UE. These may be considered instantaneous resource requirements, $C_{instant}$ and $P_{instant}$ respectively. The instantaneous throughput achievable $R_{achievable(MAC-hs)}$ (measured at the MAC-hs protocol layer) is also determined from the TFRC block size. Using the TFRC, values are generated (steps 312, 314) for:
  (i) the number of DL channelisation codes used during a TTI ('$C_{instant}$');
  (ii) the transmit power (determined from network counters as well as TFRC data) used during a TTI ('$P_{instant}$'); and
  (iii) the instantaneous throughput achievable during a TTI ('$R_{achievable}$').

Based on the R-target and the o-Iub, a target instantaneous Iub bandwidth ('$B_{Iub-instant}$') is generated (step 306) as follows:

$$B_{Iub\,Ins\,tan\,t} = R_{target}(1 + o_{Iub}),$$

where $o_{Iub}$ is the overhead introduced by the protocol layers between $R_{target}$ and a layer of interest in the Iub link.

Based on the $R_{target}$, the R-achievable, the o-MAC-hs and the MAC-hs retransmission rate value ('r'), a duty cycle ('d') is generated that represents a transmission frequency, corresponding to the $R_{target}$, for each UE (step 308). It is assumed that there may be 'average' UEs which are scheduled in the same TTI, limited by available power and codes and the number of allocated HS-SCCHs (High-Speed Shared Control Channel), or in subsequent TTIs. It is also assumed that the network's HSDPA scheduler implementation has perfect sharing properties. From these assumptions, it follows that some amount of resource sharing between 'average' UEs may be permissible, while still meeting nominal throughput targets. The duty cycle describes the frequency of transmission that will be required for each UE in order to meet nominal throughput targets. The value for the duty cycle is generated as follows:

$$d = \frac{R_{target}}{R_{achievable(MAC-hs)}} \times \frac{(1 + o_{MAC-hs})}{(1-r)}$$

where $o_{MAC-hs}$ is the overhead introduced by the protocol layers between $R_{target}$ and MAC-hs, and r is the MAC-hs retransmission rate (kbit/kbit) observed at the cell/carrier of interest.

Using the values for the total number of UEs transmitting and the total number of UEs in the scheduler (over all TTIs), an activity factor ('η') is generated representing the ratio of transmitting UEs to UEs in the scheduler (step 310). Some LTE categories are unable to receive HSDPA transmission every consecutive TTI: these UEs are only able to receive every $n_{TTI}$ TTIs. The nominal throughput target, $R_{target}$, is a short-term average, representative of the observed data rate during periods of packet transmission and should not be impacted by inter-packet periods of zero throughput. For efficiency, the network's HSDPA scheduler may allow a UE to remain in the scheduler for configurable periods of inactivity; accordingly, the scheduler's 'activity factor' is generated to account for this, and is defined as:

$$\eta = \frac{\sum_{TTIs} \text{Users transmitting}}{\sum_{TTIs} \text{Users in scheduler}}.$$

Average per-user HSDPA resource requirements are generated (in steps 312, 314, and 316) as follows:

$$C = C_{instant} \times \frac{d \times \eta}{n_{TTI}}$$

$$P = P_{instant} \times \frac{d \times \eta}{n_{TTI}}$$

$$B_{Iub} = B_{Iubinstant} \times \eta$$

where 'C' represents a number of DL channelisation codes over the reporting period for an 'average', 'P' represents the average transmit power 'P' over the reporting period for an 'average' UE, and $B_{Iub}$ represents the bandwidth allotted to an 'average' UE on the Iub link.

These values, 'C', 'P' and 'B-Iub' are environmental parameters that represent how well HSDPA throughput targets are being met, i.e., the environmental parameter data represents an estimate of the residual resources required per active user to achieve an operator-selected QoS to the UE users.

Some environmental parameter values—e.g., DCH power per user—are unreliable if there is an insufficient number of samples in the performance data for the corresponding time period for the measured values to be statistically significant. To address this difficulty, at step 318 the system can use 'tapered' ranging between each measured value and a corresponding default value by scaling each of these values depending on the number of samples available for the relevant inputs. In a tapered value generation process, for very lightly loaded network elements, the environmental parameter value is based entirely on the default value. The default value for an environmental parameter is either set by the network operator or is determined by the dimensioning system 102 based on values for this environmental parameter in equivalent network elements with better statistical data. For lightly loaded network elements, a combination of the default and the estimated value is used, interpolated with respect to loading. For moderately or heavily loaded network elements, the environmental parameter value is based only on the measured parameter data, and not on the default value. The operator, or end user, can adjust the loading thresholds that determine the extent to which the default value is used, i.e., load thresholds for 'very light' load, 'light' load, 'moderate' load and 'heavy' load.

Values in the environmental parameter data are 'granularised', or quantised, to generate only discrete values, with the nearest discrete or quantised value chosen for each instance (step 320). The quantisation process constrains the number of possible combinations of environmental parameters, and thus the number of admission regions stored in the admission region database 117. The degree of quantisation for any particular environmental parameter is not critical, but finer quantisation (i.e., providing a larger number of possible values) generally improves the accuracy of the capacity data at the expense of requiring greater computational resources.

The environmental parameters with values generated by the parameter generator 120 using the rules above are:
  (i) the Dedicated Channel (DCH) power per user;
  (ii) 'P', the Down Link (DL) Power for HSDPA;
  (iii) 'C', the number of DL Channelisation Codes for HSDPA; and
  (iv) $B_{Iub}$, the Iub Bandwidth for HSDPA, i.e. the HSDPA bandwidth over the interface between the RNC 1308 and the Node B 1306 (i.e., Iub 1310);

The other environmental parameters have values (trivially) generated from vendor-supplied counter values stored in the network performance database 106 (step 322). These other environmental parameters are:
  (v) the Soft Overhead; and
  (vi) the Softer Overhead.

The generated parameter values are sent from the environmental parameter value generator 120 to the temporary database 114 (step 324). The generated parameter values in the parameter generation process 300 are used to generate (or select) engineered capacity envelopes, also referred to herein as 'admission regions', based on one or more specified QoS criteria typically being user-perceived call blocking targets and HSDPA-specific targets related to throughput.

Admission Region Generation 400

In many multi-resource multi-service systems, user-perceived performance is impacted by metrics other than "blocking". Frequently, that performance degrades as the system becomes more heavily loaded, even when blocking probabilities remain at or near zero (and well below any engineering target), simply because users have to share access to a certain subset of resources. Blocking is assessed by whether or not a user gets access to dedicated resources, whereas other measures of user-perceived performance are dictated by whether or not a user is sharing the system with too many other users (none of which have been blocked). This degradation is modelled by the admission region, i.e., an engineered capacity envelope that accounts for non-blocking user-perceived performance metrics. The admission region data provides user-perceived performance targets and blocking probability.

In simpler communication systems, such as first- or second-generation mobile networks, the process of dimensioning entailed an implicit estimation of an admission region based solely on blocking metrics. Dimensioning of a more complex system, such as the WCDMA/HSDPA network 104, requires metrics other than simply blocking (referred to herein as 'non-blocking' metrics), in particular user-perceived QoS metrics such as HSDPA throughput.

Figure 4:
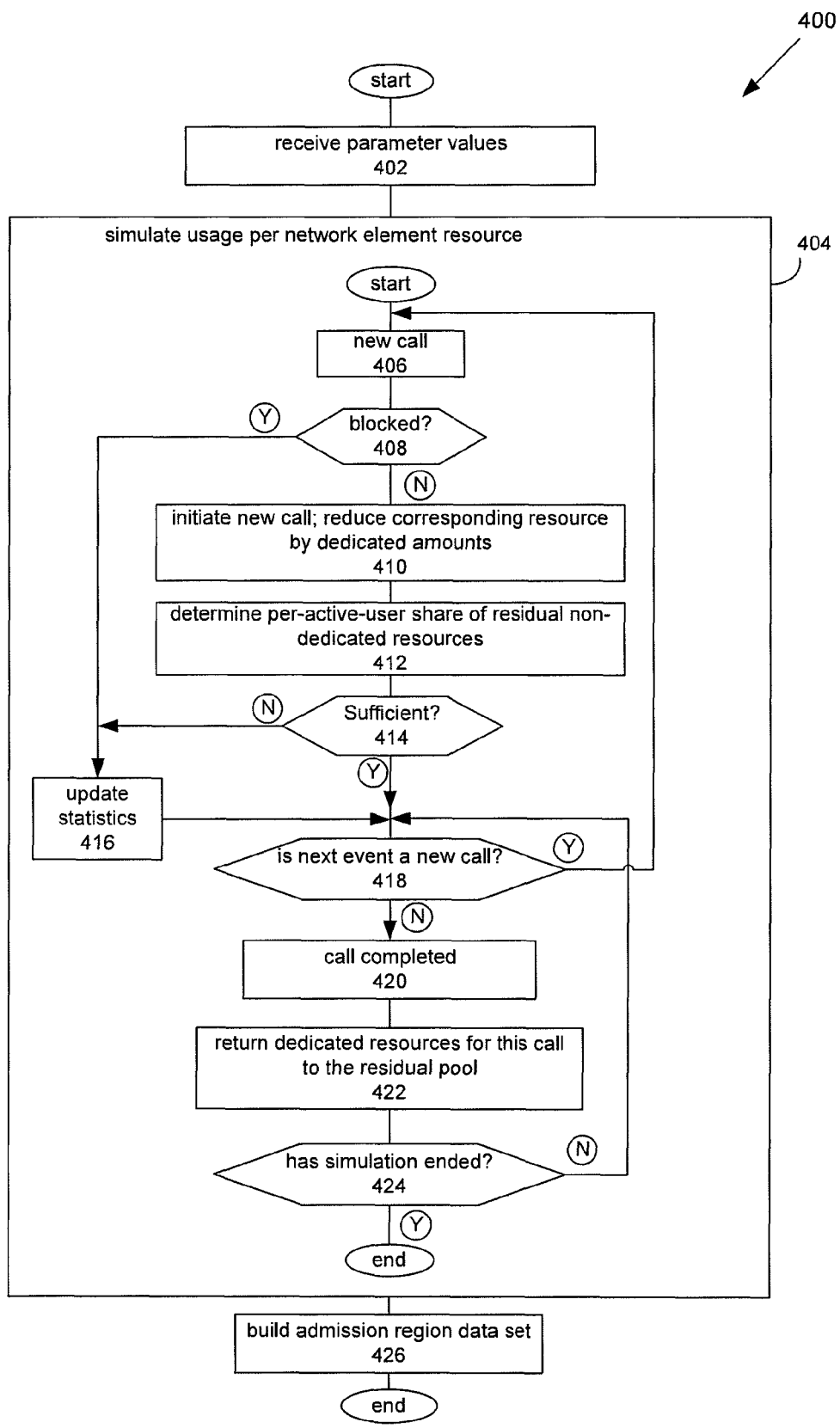
FIG. 4 is a flow diagram of an admission region generation process of the network dimensioning process.
Figure 5:
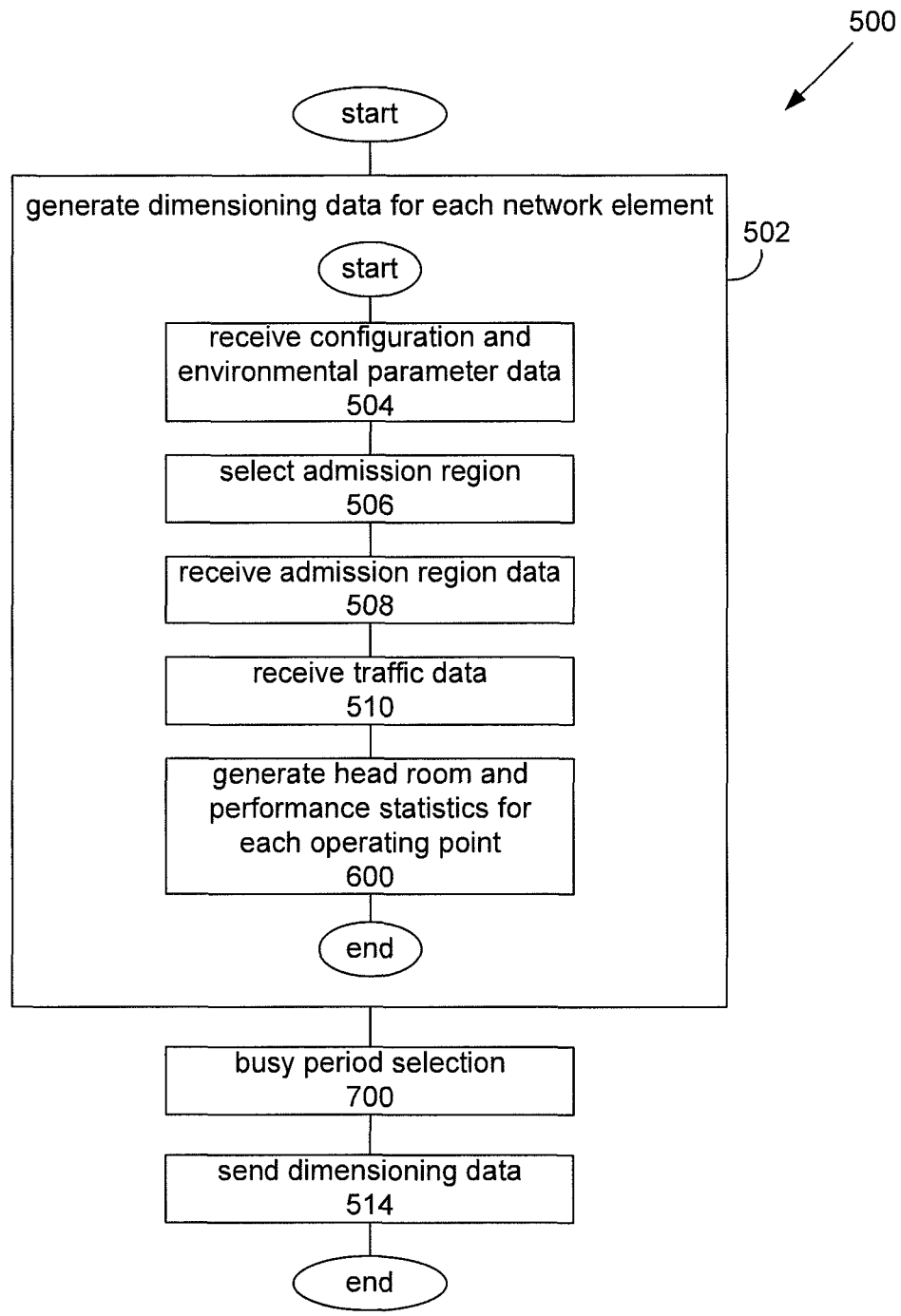
FIG. 5 is a flow diagram of a dimensioning data generation process of the network dimensioning process.

In an admission region generation process 400, as shown in FIG. 4, an engineered capacity envelope is generated for a set of target QoS criteria, in the described embodiment being blocking metrics and user-perceived HSDPA throughput. The dimensioning system 102 generates a plurality of admission regions (representing engineered capacity in the network 104) for a plurality of possible configurations and environments that is expected to be experienced by each network element in the network 104.

The admission region generator 118 implements a detailed model of the network 104 (e.g., a RAN 1302 and TN 1304). Each admission region represents an engineered capacity envelope for a corresponding specific configuration/environmental data combination. The admission region generator 118 also generates performance statistics for each (quantised) point in the admission region, including: per-service blocking rates; per-resource blocking rates; per-resource insufficient residual amount rates and resource utilisation rates. These statistics are based on counters that are updated in step 416 within step 404.

Each admission region is generated on the basis of the environmental parameter data generated by the environmental parameter value generation process 300 and configuration data from databases 108 to 112, which are received at step 402.

The admission region generator 118 generates the admission region data using a numerical model of the network 104—based on the parameter data—to simulate network operation in a simulation process 404. The network 104 is simulated using a discrete event simulation model which in the described embodiment is a Markov Chain simulation process.

In the simulation process 404, resource usage data are generated for a plurality of candidate operating points that cover the state space of interest. The state space of interest is an N-dimensional space for the N services, covering a provision of each service from zero load to a maximum load determined by the configuration of the network 104. The aim of the simulation process 404 is to determine those combinations of loads for the N services for which all of the specified QoS criteria are met, the determined combinations defining the boundary of a region of state space referred to as admission region, so that operating points on or within the admission region satisfy the QoS criteria, whereas those outside it do not meet at least one of the QoS criteria.

For each given candidate operating point (which might be, for example, 10,000,000 calls/connections at 3 Erlang of offered load for each service), data is generated representing available network resources, and the number of active calls/ connections of each service type, over the reporting time period. The number of calls/connections simulated in the simulation process 404 is selected to provide statistically significant results while not taking too long to operate, e.g. a simulation may use 10,000,000 calls. A "call/connection" refers to a use of any service, not just voice.

The Markov chain model simulates the operation of the network element in its measured environment in a statistical manner that reflects the statistical variations that occur in practice. When a particular load of a particular service is simulated, that load value (e.g., 3 Erlangs of video) represents an average value, with the actual load in practice (and as simulated) being statistically distributed about that average value in accordance with a fixed statistical distribution which in the described embodiment is a Poisson distribution, although other distributions can be alternatively used. Because resources are shared in a non-trivial manner between different services that are each statistically distributed in this manner, the Markov chain simulation allows the dimensioning system 102 to assess the net result of the complex interactions between different services; for example, the result of the simulation for a given operating point (i.e., a given combination of average loads for respective services) might be that all QoS metrics meet the specified QoS criteria, in which case the operating point lies within the admission region.

At any given time in the simulation process 404, the next event will be either a call generation or a call completion. Firstly, a new call/connection is generated (step 406), and the required resources for the connection (e.g., DL channelisation codes for a new video connection) are compared to available resources to determine whether the new call is blocked (step 408). For example, a simulated UE requests a video connection in a simulated network element, and the connection is allowed if there are at least 8 codes available between the current simulated usage and the maximum capacity of 256 codes for the simulated resource of DL channelization codes. The connection blocking test is repeated for each simulated resource. If the call/connection is blocked (due to exhaustion of any of the simulated resources), then the simulation process 404 records which resource has been exhausted (step 416). On the other hand, if the connection is not blocked, a resource accounting process first reduces each relevant resource by the dedicated amount required by the new connection (step 410), then determines if the residual non-dedicated amount of that resource is sufficient to support the non-blocking user-perceived performance targets of the current relevant connections (e.g., HSDPA connections) on that network element (steps 412 and 414). At step 414 the process 404 determines whether the level of residual non-dedicated resources is insufficient (for any of the simulated resources). If there are insufficient resources, then the simulation process 404 records which resource was the limiting factor (step 416). For example, after a new video connection is made, there could be 150 'residual' channelisation codes (after all current calls are allocated the correct number of dedicated codes), and 6 active HSDPA connections. Assuming equal sharing of the residual codes between the active HSDPA connections, each connection can access 25 residual codes. This value is compared to the per-active-HSDPA-connection minimum required number of codes that was a-priori determined (by the environmental parameter value generator 120). If the minimum required code threshold is 20 codes, then the HSDPA connections are deemed to have access to sufficient residual DL codes at that current time in the simulation process 404.

The next discrete event simulated in the Markov Chain process can be either another call generation or a call completion. That decision point is reflected as step 418. In the case of a call completion event (call termination—step 420), any dedicated resources used by that connection are returned to the pool of non-dedicated resources, for use by subsequent connections (step 422). Throughout a run of the simulation process 404, the required performance statistics are continually updated, together with an estimate of their accuracy. The simulation process 404 for each operating point completes either when a target number of calls have been completed, or a target level of accuracy has been reached for each performance statistic. Upon completion of the simulation process 404 for each operating point (assessed at step 424), the admission region generator 118 evaluates the derived performance statistics to assess whether the simulated operating point lies on (or, in practice, very close to) the admission region boundary. The admission region boundary delineates the regions in the state space where, inside the boundary, all performance metrics of interest are satisfied and outside the boundary, at least one is not. The process 404 stores all relevant performance statistics for any operating point that is deemed to lie on the boundary. The process is repeated for a plurality of operating points distributed throughout the state space of possible operating points until the dataset of operating points assessed to lie on the admission region boundary is sufficiently large to describe the entire boundary of the N-dimensional admission region (e.g., extending to all axes in the N-dimensional state space, or at least extending where typical operational conditions of the network 104 occur). This dataset can be represented as an N-dimensional array of values, where each dimension is one of N services, and each value reflects the load for that service (in units of Erlang). The N services could be, for example:

(i) SRB (standalone signalling traffic);
(ii) Speech;
(iii) Video;
(iv) R99 packet; and
(v) HSDPA Packet.

The admission region dataset is compiled (step 426) after all repetitions of the simulation process 404 are complete.

Dimensioning Data Generation Process 500

The dimensioning data is generated, in a dimensioning data generation process 500, based on a comparison of the traffic data in one traffic measurement period and the admission region most closely matching the most recent environmental parameter values.

The difference between the operating point and the maximum engineered capacity for the network 104 is summarised with a single 'headroom' value.

The dimensioning data, including the headroom data, for the most current operating point (e.g., received hourly from the databases 106 to 112) is generated in the following process (step 502), repeated for each network element in the network 104:

(i) Receive the configuration and environmental parameter data (step 504);
(ii) Select the most relevant admission region from the admission region database 117 based on the parameter data (step 506);
(iii) Receive the most relevant admission region data (step 508);
(iv) Receive the traffic data for the traffic measurement period from the temporary database 114 (step 510); and
(v) Determine the headroom and performance statistics in a headroom and performance statistics generation process 600.

Figure 6:
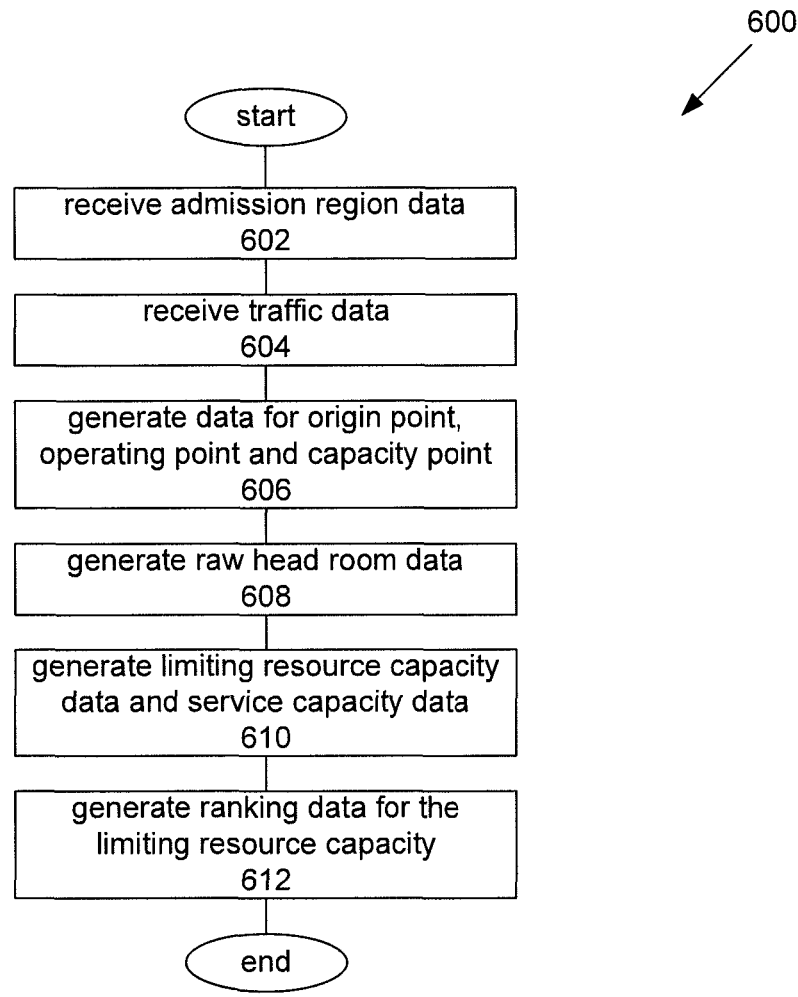
FIG. 6 is a flow diagram of a headroom and performance statistic generation process of the dimensioning data generation process.

The headroom and performance statistics generation process 600, shown in FIG. 6, is executed by a fully multithreaded process that leverages the capabilities of modern multiprocessor/multicore systems, thus ensuring scalability. The headroom and performance statistics generation process 600 is performed by the dimensioning data generator 116, based on data describing the admission region and the traffic. The main steps in the first part of the headroom generation process are:

(i) a straight line is projected in N-dimensional space from the origin (point O) through the operating point (P) to cut the system engineered capacity envelope at an intercept point (I)—step 606; and (ii) a raw headroom is generated based on the ratio PI/OI, where PI is the distance from P to I, and OI is from O to I: the reported headroom is non-negative if the system is operating within engineered capacity (the operating point lies within the envelope, i.e. OP<=OI), otherwise it is negative (i.e. if OP>OI)—step 608;

(iii) it is assumed that demand for services will grow in a uniformly proportional manner; consequently, from a current operating point P lying within the envelope, demand for services will grow until the new operating point becomes I; therefore using the admission region dataset, for any operating point, it is possible to generate data representing the percentage of time that user-perceived performance is unacceptable for any reason (either blocking due to lack of dedicated resources, or lack of shared access to non-dedicated resources), and for any of the resource types (any point that lies on the surface of the system engineered capacity envelope, will correspond to non-zero percentages for at least one of the resource types)—step 610; and (iv) the percentages for the intercept point 'I' are ranked from highest to lowest to generate a 'most likely' ranked list of the limiting resource(s) for the current operating point—step 612.

Once the dimensioning data is generated in the headroom and performance statistics generation process 600 for the traffic vector, it is returned to the process 502 to repeat analysis for the next network element.

If reported headroom is negative, that indicates that the operating point lies outside the system engineered capacity envelope, and consequently that at least one of the service-specific QoS targets is not being met.

The dimensioning data includes performance statistics of the network for each operating point, which are later used to generate estimates of impacted services and over-utilised resources.

A notional 'busy period', for characterising the capacity situation at each network element, is generated in a busy period selection process. This 'busy' reference period captures the consistently heavily loaded times (i.e., times of high traffic load) represented in the traffic data, while filtering out extreme peaks of load. Headroom and performance statistics are aggregated over the busy period, to yield single 'busy' values for each network element. The 'busy' load is a useful value for network dimensioning as it relates to a typical maximum network element usage that needs to be carried. These 'busy' values are used in a network operator's capacity management/dimensioning processes.

Figure 7:
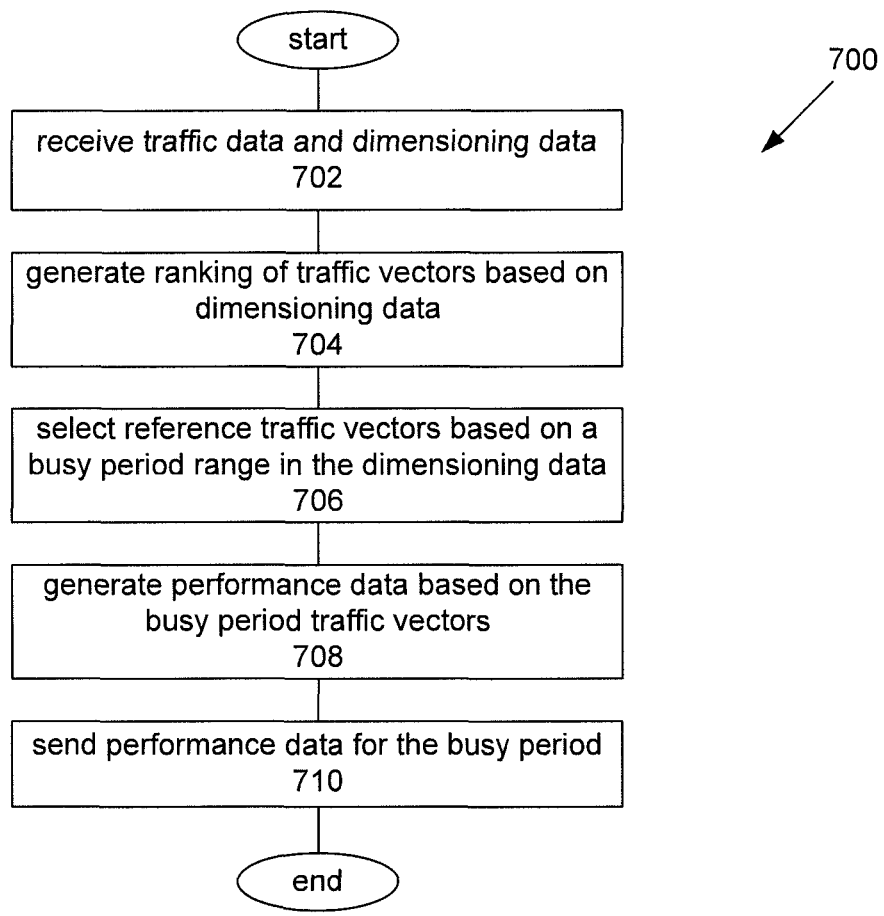
FIG. 7 is a flow diagram of a busy period selection process of the dimensioning data generation process.

As shown in FIG. 7, the busy period selection process 700 commences with the dimensioning data generator 116 receiving values for reference period parameters k, n and m, as selected by the end user, or operator, to reflect desired capacity management policy (step 702). These busy period parameters are applied in the following steps:

(i) all traffic data (i.e. operating points) is ranked by a selected measure of system capacity or loading (e.g. the headroom value generated in the dimensioning data generation process 500) as received by the system 102 (and stored in the application database 122) over the previous k weeks (step 704);

(ii) samples representing the $n^{th}$ percentile±m percent are selected to define the busy reference period (step 706); and (iii) aggregate performance statistics and metrics of interest are averaged for these samples, thus providing a summary of the capacity situation in the defined busy period (step 708).

The generated performance data for the busy period is returned to the dimensioning data generation process 500 (step 710).

The busy period can be used to compare dissimilar traffic patterns between services. The values of parameters k, n and m might be defined as, for example, 2, 95 and 1 respectively.

Web GUI Generation

The Web GUI 124 is generated in a Web GUI generation process, in which the dimensioning data received from the application database 122 is displayed in a Web interface for an end user, or operator, of the system 102. Dimensioning data from past reporting periods are stored indefinitely in the application database 122, allowing historical and trending reports to be generated. The GUI 124 generates reporting data to represent reports of the dimensioning data, including:

(i) a high level report identifying network elements worthy of attention in a capacity management process;

(ii) a two-dimensional projection of operating points and admission regions per network element;

(iii) performance estimates of impacted services and over-utilised resources per network element;

(iv) headroom values plotted over time for historical/trending purposes; and (v) network element configuration and environmental parameter data.

Figure 8:
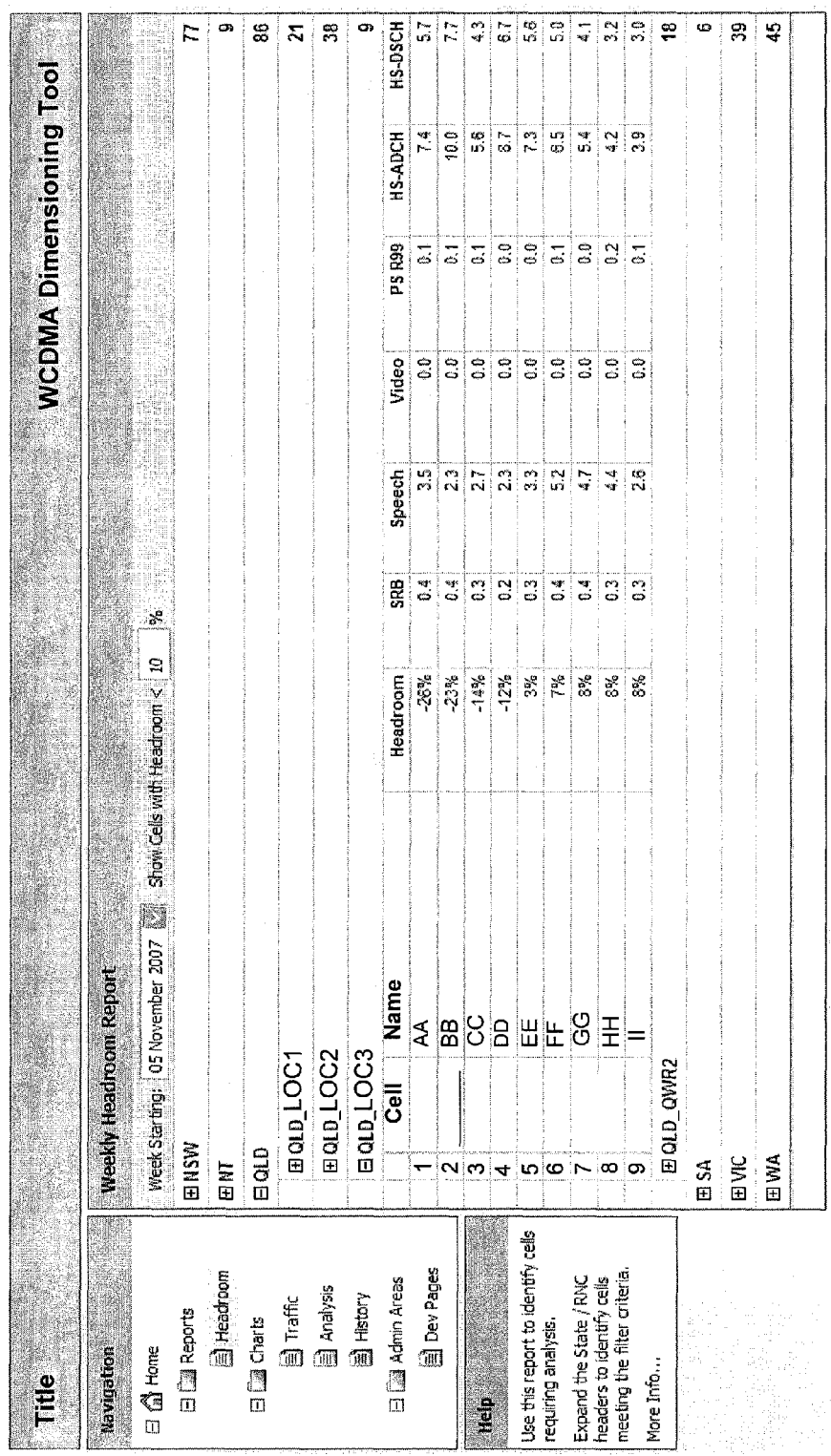
FIGS. 8 to 11 are screen shots generated by a web GUI generator of the system.

A Headroom Report is shown in FIG. 8. This page presents high level capacity data to the end user, facilitating quick identification of network elements most worthy of attention in a capacity management process.

Figure 9:
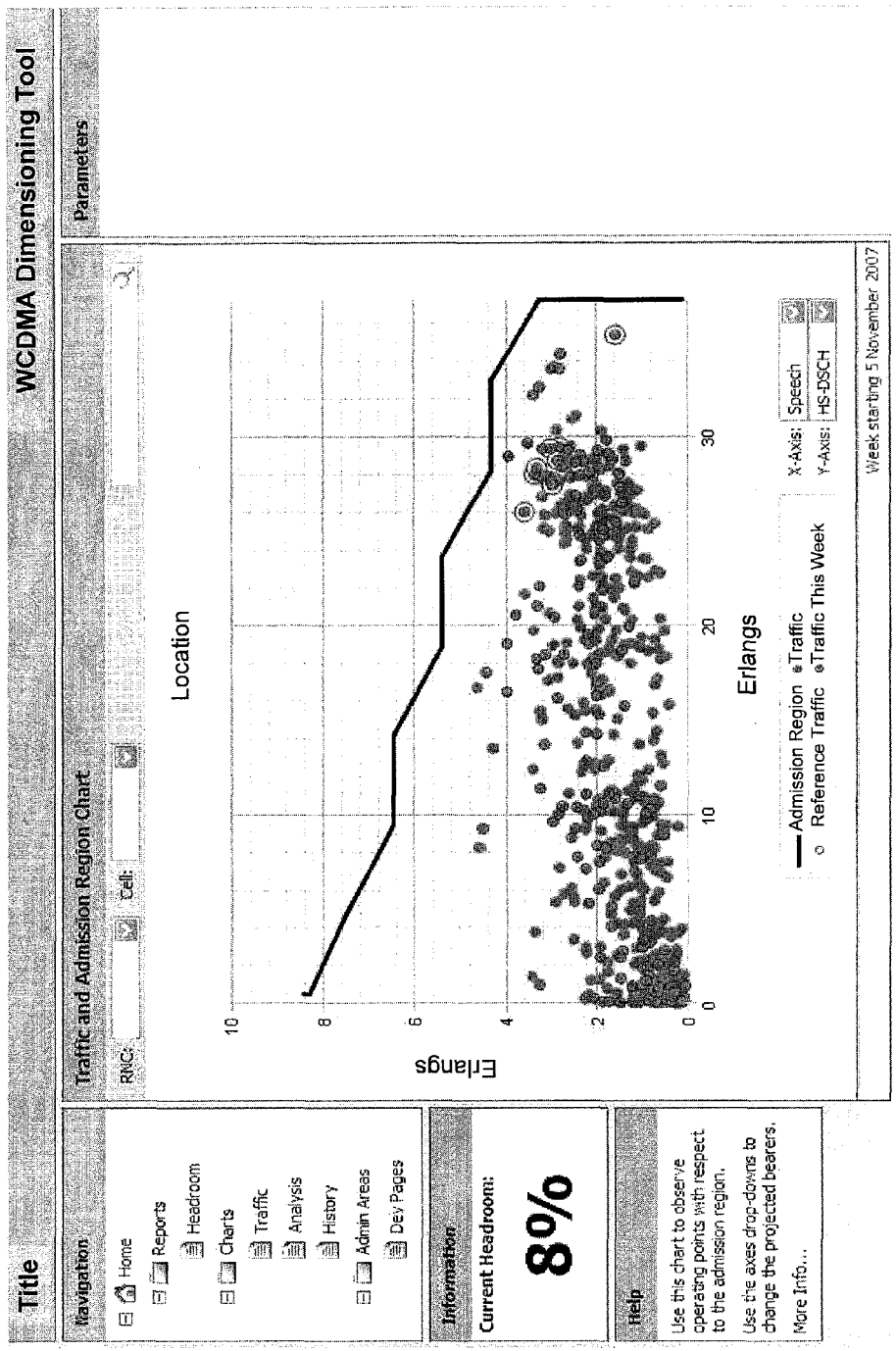

A Traffic and Admission Region Chart is shown in FIG. 9. This page presents operating point and admission region data for a selected network element. Since operating point and admission region data is multi-dimensional (one dimension for each modelled service), the page projects only two of those dimensions. The user may select the dimensions of interest. Network element configuration and environmental data is also presented.

Figure 10:
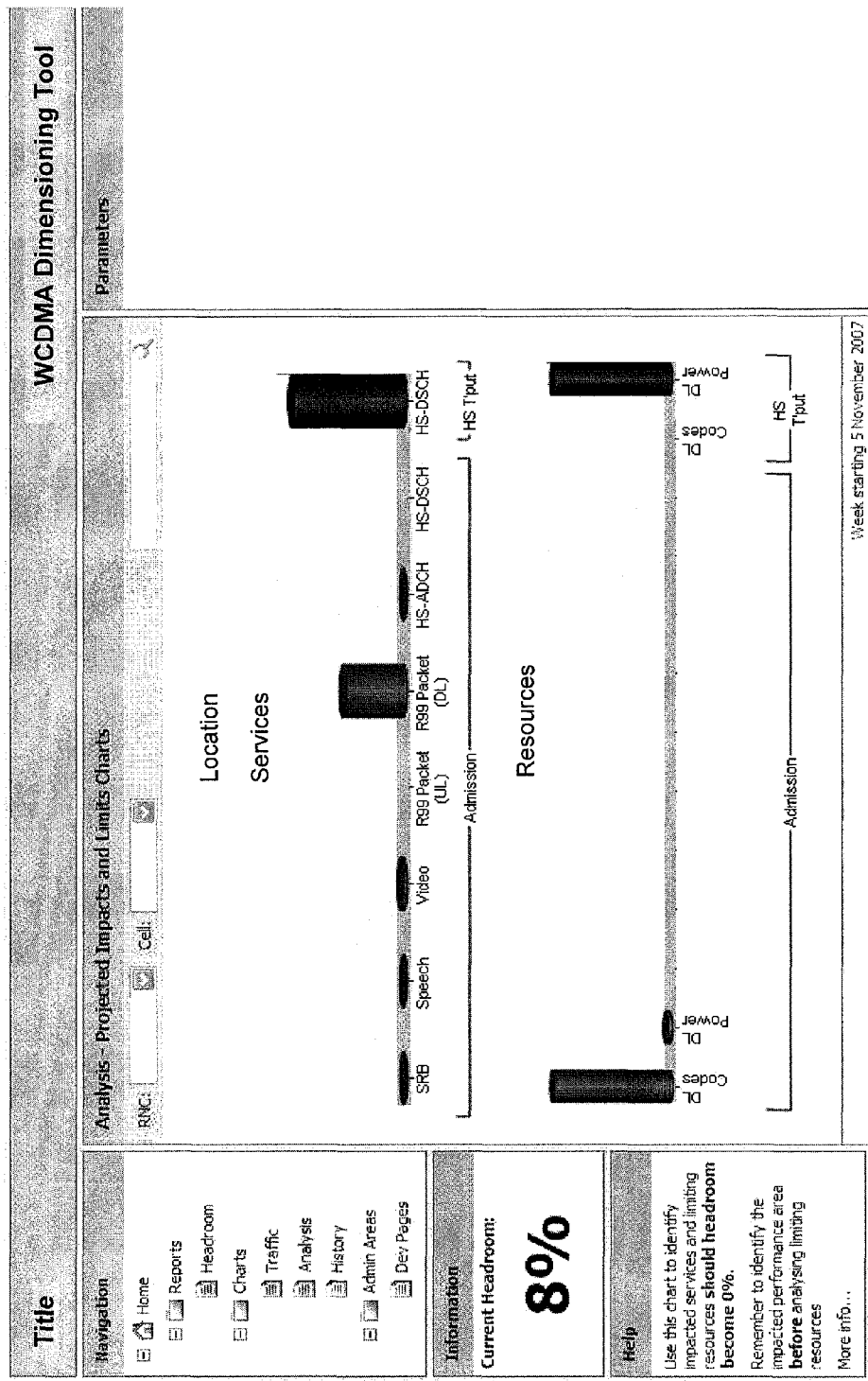

An Analysis Chart is shown in FIG. 10. This page presents estimated performance statistics generated for the reference period for the selected network element. The charts provide a forward looking estimate of anticipated performance for the point at which headroom becomes zero.

Figure 11:
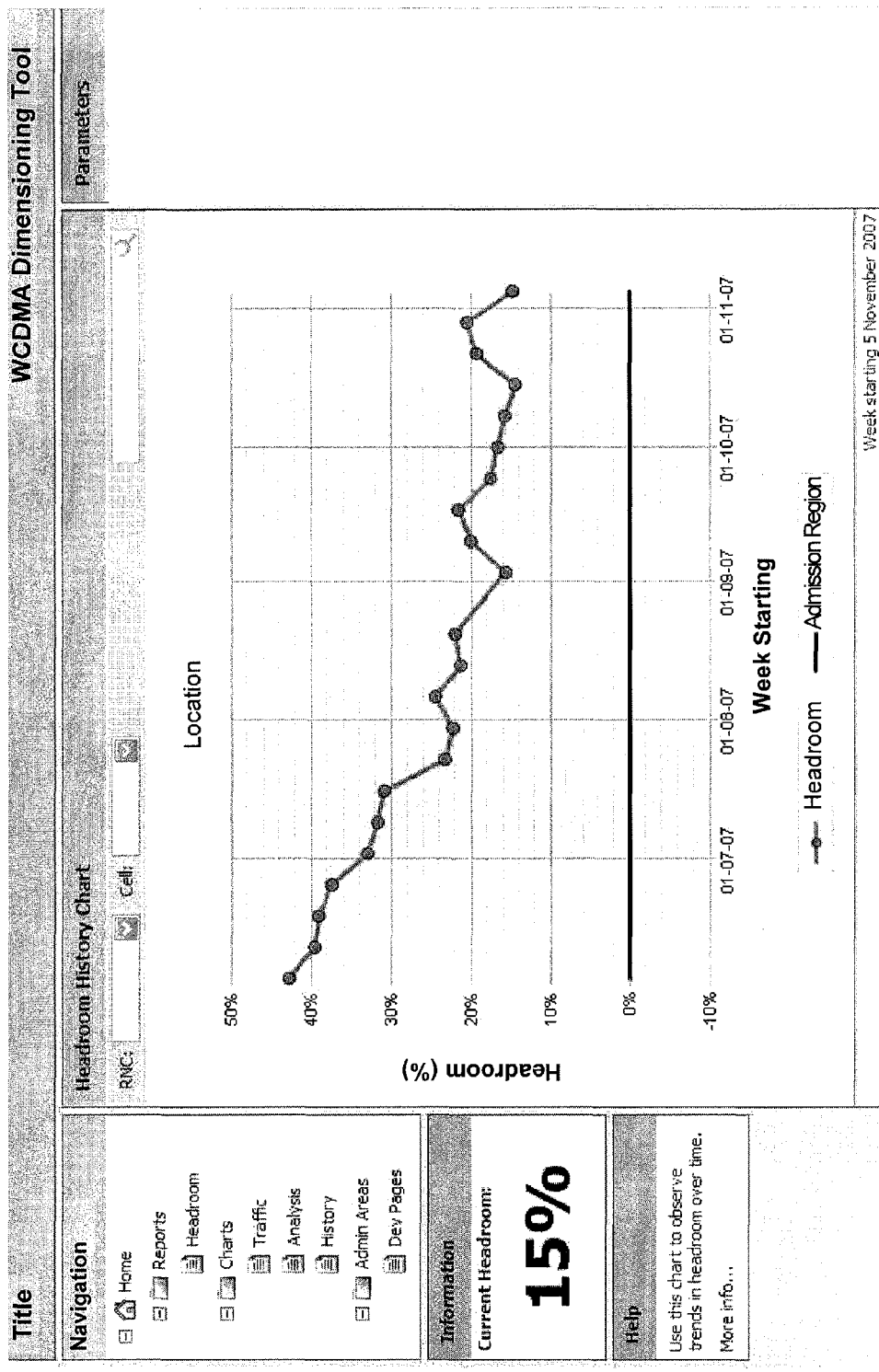

A Headroom History Chart is shown in FIG. 11. This chart is a graph of reference headroom values generated for the selected network element over all observed weeks. The information can be used for identifying historical trends for forward planning purposes.

Interacting with the dimensioning system 102, due to its Web-based graphical nature, is quicker and less labour intensive than with existing network dimensioning tools.

In the described embodiment, the dimensioning system 102 is a standard computer system such as an 32-bit or 64-bit Intel Architecture based computer system, as shown in FIG. 12, and the dimensioning process 200 executed by the system 102 is implemented in the form of programming instructions of one or more software modules stored on non-volatile (e.g., hard disk) storage 304 associated with the computer system, as shown in FIG. 12. However, it will be apparent that at least parts of the process 200 could alternatively be implemented as one or more dedicated hardware components, such as application-specific integrated circuits (ASICs) and/or field programmable gate arrays (FPGAs).

The system 102 includes standard computer components, including random access memory (RAM) 1206, eight processors 1208, and external interfaces 1210, 1212, 1214, all interconnected by a bus 1216. The external interfaces include universal serial bus (USB) interfaces 1210, at least one of which is connected to a keyboard and a pointing device such as a mouse 1218, a network interface connector (NIC) 1212 which connects the system 102 to a communications network such as the Internet 1220, and a display adapter 1214, which is connected to a display device such as an LCD panel display 1222.

The system 102 also includes a number of standard software modules 1226 to 1230, including an operating system 1224 such as Linux or Microsoft Windows XP, web server software 1226 such as Apache, available at http://www.apache.org, scripting language support 1228 such as PHP, available at http://www.php.net, or Microsoft ASP, and structured query language (SQL) support 1230 such as MySQL, available from http://www.mysql.com, which allows data to be stored in and retrieved from an SQL database 1232.

Together, the web server 1226, scripting language 1228, and SQL modules 1230 provide the system 102 with the general ability to allow users of the Internet 1220 with standard computing devices equipped with standard web browser software to access the system 102 and in particular to provide data to and receive data from the database 1232.

However, it will be understood by those skilled in the art that the specific functionality provided by the system 102 to such users is provided by scripts accessible by the web server 1226, including the one or more software modules 1202 implementing the process 200, and also any other scripts and supporting data 1234, including markup language (e.g., HTML, XML) scripts, PHP (or ASP), and/or CGI scripts, image files, style sheets, and the like.

Although a preferred embodiment of the present invention has been described above in terms of dimensioning a UMTS network, it will be apparent to those skilled in the art that the system and process can also be applied to other types of cellular networks in which resource consumption by each service is not fixed but depends upon the radio environment of each network element, and in which available resources can be shared between users of the network.

Many modifications will be apparent to those skilled in the art without departing from the scope of the present invention as hereinbefore described with reference to the accompanying drawings.

The invention claimed is:

1. A process for dimensioning a cellular telecommunications network, including, for each of one or more network elements of said network:
   accessing network element environment data representing a configuration and environment of the network element;
   accessing QoS data representing quality of service criteria for users of said network;
   processing the network element environment data and said QoS data to generate network element capacity data representing combinations of loads of network services corresponding to capacities of said network element that meet said quality of service criteria;
   processing said network element capacity data to identify one or more of the most limiting network resources,
   wherein the network element capacity data represents a boundary between combinations of loads of said services that meet said quality of service criteria and combinations of loads of said services wherein at least one of said quality of service criteria is not met, and
   wherein said step of processing said network element capacity data includes generating performance metrics representing a portion of time that user-perceived performance is unacceptable as a result of (i) blocking due to lack of dedicated resources or (ii) lack of shared access to non-dedicated resources, wherein the most limiting of said resources are identified on the basis of said performance metrics.

2. The process of claim 1, wherein said network services include services that consume network resources shared between users of said network element.

3. The process of claim 1, wherein said network services include services that consume network resources that are shared in variable amounts between users of said network element.

4. The process of claim 1, wherein said processing includes performing a numerical simulation of the network element for each of a plurality of operating points of said network element, each operating point representing specified average loads of said network services, wherein loads of said network services are statistically distributed about the corresponding average value.

5. The process of claim 4, wherein the simulation is a Markov Chain simulation.

6. The process of claim 1, wherein said quality of service criteria include at least one criterion based on a performance metric other than blocking.

7. The process of claim 1, wherein said network element environment data also represents measured loads of each of a plurality of services of the network element, and the process includes processing said network element performance data to generate network element load data representing a load of said network element as a combination of said measured loads of said services, and comparing said network element load data with said network element capacity data to generate network element headroom data representing available capacity of said network element.

8. The process of claim 1, wherein the network services include at least two of: standalone signalling radio bearer (SRB), Speech, Video, R99 packet data, and High Speed Downlink Packet Access (HSDPA) data.

9. The process of claim 1, including processing said network element capacity data to generate a ranked list of the most limiting network resources.

10. The process of claim 1, wherein said network elements include at least one cell of said network and at least one base transceiver station of said network, wherein the environment of a cell or a base transceiver station includes a radio environment of that cell or base transceiver station.

11. The process of claim 1, wherein said network is a WCDMA network.

12. A non-transitory computer readable storage medium having stored thereon program instructions for executing the steps of claim 1.

13. A system having components for executing the steps of claim 1.

14. A system for dimensioning a cellular telecommunications network, the system including:
   an environmental parameter generator configured to access network element environment data representing a configuration and environment of each of one or more network elements of said network; and a network element capacity generator configured to process the network element environment data and QoS data representing quality of service criteria for users of said network to generate network element capacity data representing combinations of loads of network services corresponding to capacities of each network element that meet said quality of service criteria, wherein the network element capacity data represents a boundary between combinations of loads of said services that meet said quality of service criteria and combinations of loads of said services wherein at least one of said quality of service criteria is not met, wherein said network element environment data also represents measured loads of each of a plurality of services of the network element, and the system includes a dimensioning data generator configured to process said network element performance data to generate network element load data representing a load of each network element as a combination of said measured loads of said services, and to compare said network element load data with said network element capacity data to generate network element headroom data representing available capacity of each of said network elements, and wherein said dimensioning data generator is configured to generate performance metrics representing a portion of time that user-perceived performance is unacceptable as a result of (i) blocking due to lack of dedicated resources or (ii) lack of shared access to non-dedicated resources, wherein the one or more of the most limiting of said resources are identified on the basis of said blocking data.

15. The system of claim 14, wherein said network element capacity generator includes a Markov chain simulator configured to simulate each of a plurality of operating points of each network element, each operating point representing specified average loads of said network services, wherein loads of said network services are statistically distributed about the corresponding average value.

16. The system of claim 14, wherein said dimensioning data generator is configured to process said network element capacity data to identify one or more of the most limiting of said resources.

17. The system of claim 14, wherein said network is a UMTS network.

18. The system of claim 14, wherein said network is a WCDMA network.

* * * * *